United States Patent [19]
Ellis et al.

[11] 4,142,911
[45] Mar. 6, 1979

[54] SAG RESISTANT ADHESIVE COMPOSITIONS

[75] Inventors: Jeffrey R. Ellis, Hightstown, N.J.; Herman B. Wagner, Perkasie, Pa.

[73] Assignee: Tile Council of America, Inc., Princeton, N.J.

[21] Appl. No.: 857,803

[22] Filed: Dec. 5, 1977

Related U.S. Application Data

[63] Continuation-in-part of Ser. No. 749,946, Dec. 20, 1976, Pat. No. 4,082,563.

[51] Int. Cl.$^2$ ................................................. C04B 7/02
[52] U.S. Cl. ..................................... 106/97; 106/111; 260/37 R
[58] Field of Search ..................... 106/90, 97, 93, 111; 260/37 R

[56] References Cited

U.S. PATENT DOCUMENTS

| | | | |
|---|---|---|---|
| 3,243,307 | 3/1966 | Selden | 106/93 |
| 3,522,068 | 7/1970 | Bastian et al. | 106/90 |
| 3,661,829 | 5/1972 | Aignesberger et al. | 106/90 |
| 3,972,723 | 8/1976 | Balle et al. | 106/90 |
| 4,021,257 | 5/1977 | Bernett | 106/90 |

*Primary Examiner*—James Poer
*Attorney, Agent, or Firm*—Morgan, Finnegan, Pine, Foley & Lee

[57] ABSTRACT

There is provided a new sag resistance imparting agent selected from among gelatinous metal hydroxides and metal salts capable of forming a gelatinous or hydrated hydroxide in the presence of a water soluble alkaline material, the agent being useful for providing sag resistance in various adhesive compositions including (a) hydraulic non-dry-set compositions comprising an hydraulic cement or plaster of paris, and (b) non-hydraulic compositions comprising a room temperature hardening polymer in the form of a resinous liquid or an emulsion, suspension, dispersion, partial solution or total solution. Methods of imparting sag resistance to adhesive compositions such as the aforementioned and methods of use for the sag resistant compositions in the installation of wall and floor covering surfaces are also provided.

37 Claims, No Drawings

SAG RESISTANT ADHESIVE COMPOSITIONS

CROSS-REFERENCE TO RELATED APPLICATION

This application is a continuation-in-part of copending application Ser. No. 749,946, filed Dec. 20, 1976 now U.S. Pat. No. 4,082,563.

BACKGROUND OF THE ART

In the installation of wall and floor covering surfaces such as ceramic tile and the like, slate, marble and the like, numerous compositions have been developed which utilize a hydraulic cement, such as Portland cement, as the principal factor in the bonding adhesives. Ordinary Portland cement per se, or together with sand or limestone fillers, is generally not preferred for this purpose since it does not have the ability to retain the water used in mixing it for sufficient time to enable an adequate bonding cure to occur. In order to overcome this disadvantage, there was developed a type of adhesive now known in the art as dry-set Portland cement mortar. These mortars possess certain advantageous properties: they may be exposed to air after mixing with water for a period of time; they may be applied to the substrates without undue hurry; they remain plastic for a sufficient period of time to permit small movements to be made in the tile installation after the initial tile to substrate surface contact; they develop strong bonding between the tile or similar surfacing and the substrate surface to which it is bonded; and they possess a reasonably predictable initial set time, minimum drying shrinkage, and some sag resistance. A number of such dry-set compositions have been developed, including those which are disclosed in U.S. Pat. No. 2,820,713.

One of the many properties required by cementitious compositions which are useful in the setting of tiles is that the composition be sag resistant. As used herein, the term "sag resistance" is intended to mean the property or characteristic of an adhesive composition to resist movement under load until a certain load level is reached. This property is important in dry-set mortars and in latex Portland cement mortars; for example, since a mortar to be practically functional must be in a slurry or paste form, on the one hand, but also must be capable of supporting the load imposed upon it during setting, on the other hand. Thus, it is vital that the mortar support a tile without any appreciable sinking of the tile into the mortar during the period in which the mortar sets or hardens. In wall applications, sag resistance is even more important because the mortar must hold the tile in position on the wall during the setting period.

In the course of development of dry-set mortars, i.e., mortars based on the use of a water retentive agent which set or harden upon the addition of water, it has been found that the sag resistance could be substantially improved by the addition of fibrous materials, such as asbestos fibers. Since the time of this initial discovery, it has been desirable to find substitutes for some of these fibrous materials, especially asbestos fiber. In U.S. Application Ser. No. 749,946, filed Dec. 20, 1976, assigned to the same assignee as herein, now U.S. Pat. No. 4,082,563 there are disclosed sag-resistant dry-set cementitious hydraulic compositions based on the use of certain salts which, under appropriate conditions, form gelatinous or hydrated hydroxides. These additives are non-fibrous, non-toxic and, in addition, provide sag resistance properties comparable to those imparted by asbestos fibers. The compositions of Ser. No. 749,946 include an hydraulic cement and a water retentive agent or agents.

The use of certain metal salts in other types of cementitious compositions for specific purposes other than to provide sag resistance has been proposed in the art. In U.S. Pat. No. 1,901,890 to Barnhart, for instance, a mixture of certain sulfates, e.g., sulfates of alkali metals, aluminum and manganese, are taught for the purpose of creating a glaze-forming and waterproofing composition for cementitious materials. In U.S. Pat. No. 2,890,965 to Underdown, it is proposed that certain salts, inter alia, aluminum sulfate, improve the plasticity and flowability of certain cementitious materials. The use of certain aluminum, iron and chromium salts is disclosed in U.S. Pat. No. 2,390,138 to Vallandigham for the purpose of accelerating the setting of alginate salts used in the manufacture of dental casts.

Other uses are disclosed elsewhere in the art. In U.S. Pat. No. 3,114,647 to Mecham, it is disclosed that certain double metal salts, i.e., salts of ammonium and trivalent metals such as aluminum, iron, manganese and chromium, as well as aluminum sulfate, increase the hardness of materials made from Portland cement. Mecham also specifies the use of sulfuric acid as well as calcium chloride as being necessary to achieve the desired effect.

U.S. Pat. No. 3,313,638 to Konrad discloses the use of low concentrations of aluminum chloride in compositions for castable refractory material with reduced physical separation of cement from calcined kaolin clays.

U.S. Pat. No. 3,782,991 to Burge discloses the specific use of anhydrous aluminum sulfate as an accelerator for low temperature concreting.

Prior to the discovery disclosed in U.S. application Ser. No. 749,946, however, it was not previously recognized in the art that certain metals salts capable of forming gelatinous or hydrated hydroxides are effective in imparting sag resistance to dry-set cementitious mortar compositions.

SUMMARY OF THE INVENTION

This invention is based on the discovery that gelatinous metal hydroxides and metal salts capable of forming a gelatinous hydroxide in the presence of a water soluble alkaline material, including those salts disclosed in Ser. No. 749,946, are also widely useful, even though they are non-fibrous, in providing sag resistance in a broad range of other room temperature hardening adhesive compositions, over and apart from the hydraulic dry-set mortar cementitious compositions which are the subject of Ser. No. 749,946. These other compositions include (a) hydraulic non-dry-set cementitious compositions comprising an hydraulic cement or plaster of paris, and (b) non-hydraulic adhesive compositions comprising a room temperature hardening polymer.

The term "hydraulic" is used herein in its conventional sense to refer to compositions or materials which cure or harden in the presence of and upon interaction with added water.

The effectiveness of the non-fibrous agents of this invention in imparting sag resistance to these other compositions is most surprising, in view of the difference in nature between such compositions and the dry-set cementitious mortar compositions of Ser. No. 749,946. The so-called "dry-set" cementitious mortar compositions are based on the use of a water retentive agent which prevents or retards the loss of water during the period in which the composition cures or hardens. These are to be distinguished from the non-dry-set cementitious compositions of this invention which, while being capable of hardening upon admixture with water, do not depend on the use of a water retentive agent. As a consequence, the non-dry-set cementitious compositions normally require the addition of larger amounts of water in practice, in comparison with the corresponding dry-set compositions. Despite the need for such larger amounts of water, the sag resistance imparting agents of this invention are, surprisingly, just as effective in providing sag resistance as in the case of the water retentive agent-containing dry-set compositions.

Just as surprisingly, the sag resistance imparting agents of this invention are effective for the same purpose in adhesive compositions of the non-hydraulic type, which are based on the use of a room temperature hardening polymer. While these compositions may contain water, they are unlike dry-set and non-dry-set hydraulic compositions in that the hardening action of the polymeric adhesive material is not dependent upon interaction with water.

In one of its aspects, this invention comprises sag resistant adhesive compositions which do not contain a water retentive agent, the compositions comprising in admixture;

(A) an adhesive material selected from the group consisting of (a) materials capable of hardening at room temperature upon admixture with water, the materials being selected from among hydraulic cements and plaster of paris, and (b) room temperature hardening polymers; and (B) at least one non-fibrous compound selected from the group consisting of gelatinous metal hydroxides and metal salts capable of forming a gelatinous or hydrated hydroxide in the presence of a water soluble alkaline material, the compound or compounds being present in an amount at least sufficient to provide the desired sag resistance.

In general, amounts of component (B) of at least about 0.2, and preferably from about 0.2 to about 5.0% by weight of the composition, are employed to provide the desired values of sag resistance.

The metal salts of component (B) can be water soluble, hydrated or anhydrous. The cations of the salts of this invention are selected from the groups consisting of aluminum cations, cations of the transition elements other than copper of Period 4 of the Periodic Table of the Elements: scandium, titanium, vanadium, chromium, manganese, iron, cobalt, nickel and zinc, and preferably, chromium, manganese, iron, nickel and zinc; the cations of cerium and antimony; and the mixed cations of mono and trivalent metals, designated herein as $M^I M^{III}$ mixed salts, where $M^I$ is an alkali metal, e.g., sodium, potassium or ammonium, and the like, and where $M^{III}$ is a trivalent metallic cation of Periods 3 or 4 of the Periodic Table of the Elements, preferably aluminum, chromium or iron.

The anions which are used in these salts are preferably selected from among the anions of strong mineral acids, e.g., sulphate, chloride and nitrate, as well as carboxylic acids, preferably alkanoic acids having up to 20 carbon atoms in the chain, including formates and oxalates. Especially preferred among the organic anions are oxalate and stearate.

Special mention is made of aluminum hydroxide and aluminum sulfate, especially powdered aluminum sulfate, as highly preferred compounds for use as the sag resistance imparting agent.

As mentioned above, the additive salts of this invention possess a common chemical characteristic in that all of these salts are capable of forming a gelatinous or hydrated hydroxide in the presence of an alkaline material, and more specifically, an aqueous solution of a base. The water soluble alkaline materials with which the metal salts are capable of co-reacting to form gelatinous or hydrated hydroxides can be organic or inorganic. Examples of inorganic compounds include but are not limited to lime, i.e., calcium oxide, as well as both monobasic water soluble compounds such as ammonium hydroxide and alkali metal and alkaline earth metal hydroxides or salts, e.g., sodium hydroxide, potassium hydroxide, soda ash and the like. Among these, lime is preferred.

Examples of organic alkaline materials include but are not limited to aliphatic and cycloaliphatic primary and secondary amines such as diethylene triamine, morpholine, diethanol amine, monoethanol amine, 2-methyl-2-amino propanol, and the like.

In general, enough of the alkaline material should be present in the aqueous composition, i.e., after water has been added to the dry mix, to provide a pH of at least about 7.1, preferably from about 8 to about 13.

The sag resistance imparting agent of this invention, component (B), is useful in a wide variety of non-dry-set cementitious compositions capable of hardening upon admixture with water. By way of illustration, this includes Portland cement-based patching plasters and stucco compositions, as well as plaster of paris-based patching and spackling formulations.

The non-hydraulic compositions of this invention, in their broadest aspects, include any polymer-based adhesive composition capable of hardening at room temperature to form a connecting medium between surfaces and in which sag resistance is desired. Such polymers include, for example:

urea-formaldehyde resins
melamine-formaldehyde resins
polysiloxanes
phenolic resins
polyamides
polyesters
polyurethanes
polyacrylates
epoxy resins
polyacetals
polyacrylonitrile
polyalkyl methacrylates
polyalkyl acrylates
polyvinyl alcohol esters
polyvinyl chloride
polyvinylidene chloride
polyolefins
styrene-butadiene copolymers
neoprene elastomers (preferably in latex form)
polyvinyl acetate, and combinations of any of the foregoing The molecular weight range of the polymers used in this invention can vary from 500 to one million, depending on the particular polymer. For the purposes of this invention, the preferred polymers are those which are either commercially available or readily prepared using known techniques. The molecular weight is not critical, but rather it is the ability of the polymer to coalesce or harden at temperatures in the range of from about 30° F. to about 140° F.

The polymer can be in the form of a resinous liquid or in the form of an emulsion, suspension, dispersion, partial solution or total solution.

Water is a preferred liquid medium for use in non-hydraulic polymeric compositions. However, organic solvents, and especially polar solvents, e.g., alcohols, ketones, esters, liquid amides, and the like, can also be used. Regardless of which materials are used as the primary liquid constituent, the non-hydraulic polymeric composition should contain water or a polar solvent in an amount at least sufficient to support gel formation in the presence of the sag resistance imparting agent.

The sag resistance imparting agents of this invention are especially useful in polymer-based non-hydraulic compositions of the type used in the grouting or setting of tiles. Special mention is made of the formulations disclosed in Weiant et al, U.S. Pat. No. 3,915,917 and U.S. Pat. No. 3,967,429, and Bernett et al, U.S. Pat. No. 3,940,358 and U.S. Pat. No. 3,706,696, the disclosures of which are incorporated herein by reference to save unnecessary detail.

In preferred embodiments, the compositions of this invention comprise (A) from about 20 to about 100% by weight of an hydraulic cement or plaster of paris, or from about 5 to about 100% by weight, preferably from about 5 to about 80% by weight of a room temperature curable polymer, in combination with (B) from about 0.2 to about 5.0% by weight of the sag resistance imparting agent, on a dry solids basis.

The compositions of this invention can also further include other ingredients for their conventionally employed purposes, such as inert fillers, coloring agents, stabilizers, foam breakers, dispersants, wetting agents, emulsifiers, fungicides, and the like. The filler, by way of illustration, can be selected from among sand, perlite vermiculite, glass beads, powdered walnut shells, limestone, powdered inert metals, pigments such as titanium dioxide, and the like. In those compositions where a hydraulic cement is employed, a weight ratio of cement to inert filler in the range of from about 0.15:1 to about 4:1 is preferred.

In the case of the hydraulic non-dry-set compositions, the amount of water to be admixed with the dry blend prior to use will vary in accordance with the particular compositions. In general, the amount of water is influenced by the amount of inert filler present. Thus, where no filler or only minor amounts of filler are used, the proportion of water added to the dry blend ranges from about 20 to about 60% by weight, based on the weight of the dry blend. On the other hand, where large amounts of filler are used, the amount of water normally ranges from about 10 to about 40% by weight of the dry blend.

This invention also provides a method of imparting sag resistance to adhesive compositions not containing a water retentive agent, the method comprising adding a sag resistance imparting agent as described to one or more of the aforementioned non-polymeric or polymeric room temperature hardening materials.

In still another aspect of this invention, there is provided an improvement in the method of installing wall and floor covering surfaces, such as ceramic tiles and the like, slate, marble, etc., using the sag resistant compositions as described.

DESCRIPTION OF THE SPECIFIC EMBODIMENTS

The compositions and methods of this invention are illustrated in the following examples.

EXAMPLE 1

A Portland cement-based patching plaster according to this invention is prepared using the following ingredients in dry admixture:

| Ingredients | Amount, % By Weight |
| --- | --- |
| white Portland cement | 23.2 |
| slaked lime | 5.8 |
| sand[a] | 69.8 |
| aluminum sulfate | 1.2 |

[a]comprising about 95% by weight of particles having a particle size of 140 mesh or less, U.S. Standard Sieve, and about 5% by weight of particles having a mesh size of greater than 140 mesh.

Water in the amount of 21.9% by weight, based on the weight of the dry blend, is added to obtain a workable viscosity, and the resulting aqueous composition is trowelled onto a vertically disposed glass plate between guide strips ¼ inch thick. A Type B tile, in accordance with American National Standard Specification A 118.1 (1967), is tapped lightly onto the surface of the trowelled patching plaster immediately after application. The top edge of the tile is accurately marked, and any downward displacement of the tile two hours after placement is measured as the sag. No sag is observed after two hours.

By way of comparison, a control formulation containing the same ingredients in the same amounts, but without aluminum sulfate, is tested and the tile is observed to sag and fall off the glass plate within two hours.

EXAMPLE 2

A plaster of paris-based patching and spackling composition in accordance with this invention is prepared using the following ingredients in dry admixture:

| Ingredients | Amount, % By Weight |
| --- | --- |
| plaster of paris | 79.0 |
| casein glue | 9.9 |
| limestone[b] | 9.9 |
| aluminum sulfate | 1.2 |

[b]comprising approximately 95% by weight of calcium carbonate and about 5% by weight of magnesium carbonate, particle size 200 mesh, U.S. Standard Sieve.

Water in the amount of 34.0% by weight, based on the dry blend, is added to obtain a workable viscosity and the resulting aqueous composition is evaluated for sag resistance using the test procedure described in Example 1. After two hours, a sag of ⅜ inch is observed.

By way of comparison, a control formulation is prepared using the same ingredients and the same amounts, but without aluminum sulfate added. The aqueous composition is trowelled onto a glass plate without a load being imposed upon it, i.e., no tile is applied. The control composition is observed to sag 4 inches within a period of two hours even without an imposed load.

EXAMPLE 3

A Portland cement-based stucco composition according to this invention is prepared using the following ingredients in dry admixture:

| Ingredients | Amount, % By Weight |
| --- | --- |
| Portland cement | 23.5 |
| sand[a] | 70.5 |
| limestone[b] | 4.8 |
| aluminum sulfate | 1.2 |

[a] as in Example 1
[b] as in Example 2

Water in the amount of 20.0% by weight, based on the dry blend, is added to obtain a workable viscosity, and the aqueous composition is evaluated for sag resistance using the procedure described in Example 1. No sag is observed.

By way of comparison, a control formulation without aluminum sulfate is observed to sag and fall off the plate within two hours even though no load is imposed.

EXAMPLE 4

An organic polymer-based adhesive composition according to this invention is prepared using the following ingredients:

| Ingredients | Amount, % By Weight |
| --- | --- |
| Vinyl acetate resin | 65.38 |
| Water | 32.93 |
| aluminum sulfate | 1.23 |
| calcium hydroxide | 0.46 |

Using the procedure described in Example 1, the composition is evaluated for sag resistance, and a sag of ¼ inch within a 2-hour period is observed.

For purposes of comparison, a control composition containing the same ingredients in the same amounts is prepared, except that aluminum sulfate and calcium hydroxide are not included. The control composition is evaluated for sag resistance using the same test procedure, with the result that the tile falls off within 2 hours, indicating complete failure.

Other modifications and variations of this invention will suggest themselves to those of ordinary skill in the art in the light of the above disclosure. It is to be understood, therefore, that changes may be made in the particular embodiments described herein which are within the full intended scope of the invention as defined in the appended claims.

We claim:

1. A sag resistant adhesive composition which does not contain a water retentive agent, the composition comprising in admixture:
    (A) an adhesive material selected from the group consisting of (a) materials capable of hardening at room temperature upon admixture with water, the materials being selected from among hydraulic cements and plaster of paris, and (b) room temperature hardening polymers; and
    (B) at least one non-fibrous compound selected from the group consisting of gelatinous metal hydroxides and metal salts capable of forming a gelatinous or hydrated hydroxide in the presence of a water soluble alkaline material, the compound or compounds being present in an amount at least sufficient to provide the desired sag resistance.

2. A composition according to claim 1 in which component (B) is present in an amount of at least about 0.2% by weight of the composition.

3. A composition according to claim 2 in which component (B) is present in an amount of from about 0.2 to about 5.0% by weight of the composition.

4. A composition according to claim 1 in which component (A) is a material selected from among hydraulic cements and plaster of paris.

5. A composition according to claim 4 in which the hydraulic cement is Portland cement.

6. A composition according to claim 4 which includes an inert filler.

7. A composition according to claim 6 in which the weight ratio of cement to inert filler is in the range from about 0.15:1 to about 4:1.

8. A composition according to claim 1 in which component (A) is a room temperature hardening polymer in the form of a resinous liquid or an emulsion, suspension, dispersion, partial solution or total solution.

9. A composition according to claim 1 wherein component (B) is a gelatinous metal hydroxide.

10. A composition according to claim 9 wherein the gelatinous metal hydroxide is aluminum hydroxide.

11. A composition according to claim 1 wherein component (B) is a metal salt capable of forming a gelatinous or hydrated hydroxide in the presence of a water soluble alkaline material.

12. A composition according to claim 11 wherein the metal salt comprises at least one anion and at least one cation, the cationic moieties being selected from among
    (i) aluminum cations,
    (ii) cations of the transition elements other than copper of Period 4 of the Periodic Table,
    (iii) the cations of cerium or antimony, and
    (iv) the mixed cations of the classification $M^I M^{III}$ where $M^I$ is an alkali metal or ammonium cation and $M^{III}$ is a trivalent cation of Periods 3 and 4 of the Periodic Table, and the anionic moieties are selected from anions of strong mineral acids and of alkanoic acids having up to 20 carbon atoms in the chain.

13. A composition according to claim 11 wherein the metal salt is powdered aluminum sulfate.

14. A composition according to claim 1 wherein the water soluble alkaline material is lime.

15. A method of imparting sag resistance to an adhesive composition which does not contain a water retentive agent, the composition comprising (A) an adhesive material selected from the group consisting of (a) materials capable of hardening at room temperature upon admixture with water, the materials being selected from among hydraulic cements and plaster of paris, and (b) room temperature hardening polymers, the method comprising adding to said adhesive material at least one non-fibrous sag resistance imparting agent selected from the group consisting of gelatinous metal hydroxides and metal salts capable of forming a gelatinous or hydrated hydroxide in the presence of a water soluble alkaline material, the compound or compounds being present in an amount at least sufficient to provide the desired sag resistance.

16. A method according to claim 15 in which the sag resistant compound is added in an amount of at least about 0.2% by weight of the composition.

17. A method according to claim 16 in which the sag resistant compound is added in an amount of from about 0.2 to about 5.0% by weight of the composition.

18. A method according to claim 15 in which the adhesive material is selected from among hydraulic cements and plaster of paris.

19. A method according to claim 15 in which the adhesive composition includes an inert filler.

20. A method according to claim 19 in which the weight ratio of cement to filler is in the range from about 0.15:1 to about 4:1.

21. A method according to claim 15 in which the adhesive material is a room temperature hardening polymer in the form of a resinous liquid or an emulsion, suspension, dispersion, partial solution or total solution.

22. A method according to claim 15 wherein the sag resistance imparting agent is gelatinous aluminum hydroxide.

23. A method according to claim 15 wherein the sag resistance imparting agent is powdered aluminum sulfate.

24. In a method of installing floor and wall covering surfaces with sag resistant adhesive compositions, the improvement which comprises using a sag resistant adhesive composition which does not contain a water retentive agent and which comprises in admixture:
 (A) an adhesive material selected from the group consisting of (a) materials capable of hardening at room temperature upon admixture with water, the materials being selected from among hydraulic cements and plaster of paris, and (b) room temperature hardening polymers; and
 (B) at least one non-fibrous compound selected from the group consisting of gelatinous metal hydroxides and metal salts capable of forming a gelatinous or hydrated hydroxide in the presence of a water soluble alkaline material, the compound or compounds being present in an amount at least sufficient to provide the desired sag resistance.

25. A method according to claim 24 in which component (B) is present in an amount of at least about 0.2% by weight of the composition.

26. A method according to claim 25 in which component (B) is present in an amount of from about 0.2 to about 5.0% by weight of the composition.

27. A method according to claim 24 in which component (A) is a material selected from among hydraulic cements and plaster of paris.

28. A method according to claim 27 in which the hydraulic cement is Portland cement.

29. A method according to claim 24 which includes an inert filler.

30. A method according to claim 29 in which the weight ratio of cement to inert filler is in the range from about 0.15:1 to about 4:1.

31. A method according to claim 24 in which component (A) is a room temperature hardening polymer in the form of a resinous liquid or an emulsion, suspension, dispersion or partial solution or total solution.

32. A method according to claim 24 wherein component (B) is a gelatinous metal hydroxide.

33. A method according to claim 32 wherein the gelatinous metal hydroxide is aluminum hydroxide.

34. A method according to claim 24 wherein component (B) is a metal salt capable of forming a gelatinous or hydrated hydroxide in the presence of a water soluble alkaline material.

35. A method according to claim 34 wherein the metal salt comprises at least one anion and at least one cation, the cationic moieties being selected from among
 (i) aluminum cations,
 (ii) cations of the transition elements other than copper of Period 4 of the Periodic Table,
 (iii) the cations of cerium or antimony, and
 (iv) the mixed cations of the classification $M^I M^{III}$ where $M^I$ is an alkali metal or ammonium cation and $M^{III}$ is a trivalent cation of Periods 3 and 4 of the Periodic Table, and the anionic moieties are selected from anions of strong mineral acids and of alkanoic acids having up to 20 carbon atoms in the chain.

36. A method according to claim 34 wherein the metal salt is powdered aluminum sulfate.

37. A method according to claim 24 wherein the water soluble alkaline material is lime.

* * * * *